(12) United States Patent
Houssian et al.

(10) Patent No.: US 9,145,264 B2
(45) Date of Patent: Sep. 29, 2015

(54) GRAIN AUGER SUPPORT FRAME

(71) Applicant: Meridian Manufacturing, Inc., Storm Lake, IA (US)

(72) Inventors: Terry Douglas Houssian, Saskatchewan (CA); Bradley Metro Zazula, Saskatchewan (CA)

(73) Assignee: Meridian Manufacturing, Inc., Winkler (CA)

( * ) Notice: Subject to any disclaimer, the term of this patent is extended or adjusted under 35 U.S.C. 154(b) by 111 days.

(21) Appl. No.: 13/917,363

(22) Filed: Jun. 13, 2013

(65) Prior Publication Data

US 2014/0367219 A1 Dec. 18, 2014

(51) Int. Cl.
*B65G 33/00* (2006.01)
*B65G 41/00* (2006.01)
*A01D 87/00* (2006.01)

(52) U.S. Cl.
CPC .............. *B65G 41/008* (2013.01); *A01D 87/00* (2013.01); *B65G 33/00* (2013.01); *B65G 41/001* (2013.01); *B65G 41/002* (2013.01)

(58) Field of Classification Search
CPC ..... B65G 41/008; B65G 41/001; B65G 33/00
USPC ........................ 198/313, 581, 861.1; 301/128
See application file for complete search history.

(56) References Cited

U.S. PATENT DOCUMENTS

| | | | | |
|---|---|---|---|---|
| 4,452,327 A | * | 6/1984 | Mowat et al. | 180/11 |
| 4,534,438 A | * | 8/1985 | Mowat et al. | 180/209 |
| 5,873,447 A | * | 2/1999 | Plett | 198/316.1 |
| 6,068,103 A | * | 5/2000 | Werner | 198/311 |
| 7,455,173 B1 | * | 11/2008 | Fridman et al. | 198/812 |

OTHER PUBLICATIONS

Farm King, Grain Handling, http://www.farm-king.com [retrieved from internet on Jun. 13, 2013], 28 pages.
Farm King, Operator and Parts Manual, http://www.farm-king.com [retrieved from internet on Jun. 13, 2013], 74 pages.

* cited by examiner

*Primary Examiner* — Leslie A Nicholson, III
(74) *Attorney, Agent, or Firm* — McKee, Voorhees & Sease, PLC

(57) ABSTRACT

A grain auger has a frame, a conveyor mounted on the frame for movement between a lowered transport position and a raised use position, and an axle with a pair of wheels to rollably support the auger. The axle has angular disposed hollow members with telescoping arms extending therefrom so that the length and height of the axle is adjustable. A cradle is provided on top of the axle, with a support block at the top of the lift assembly for nesting in the cradle when the conveyor is in the lowered transport position, to minimize the cantilever of the conveyor during transport.

14 Claims, 11 Drawing Sheets

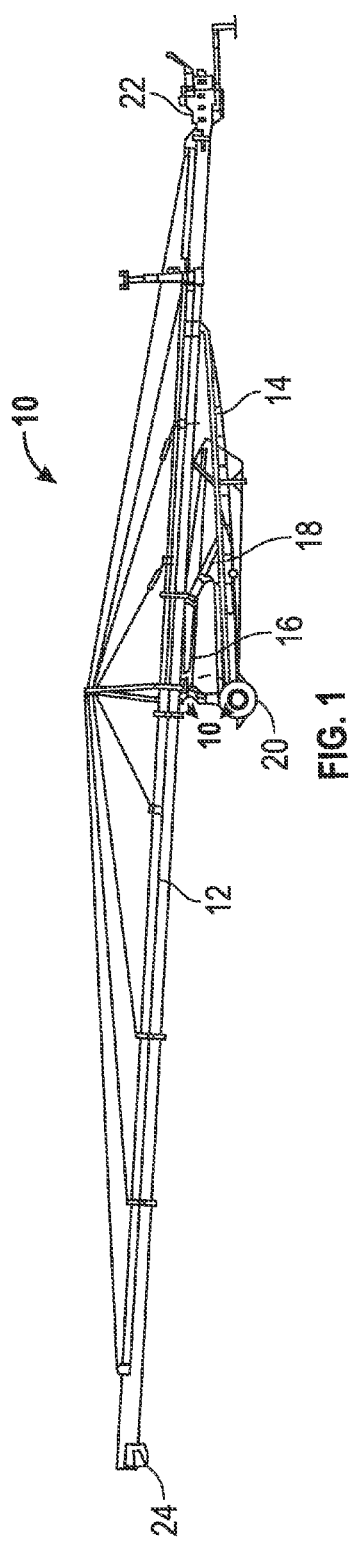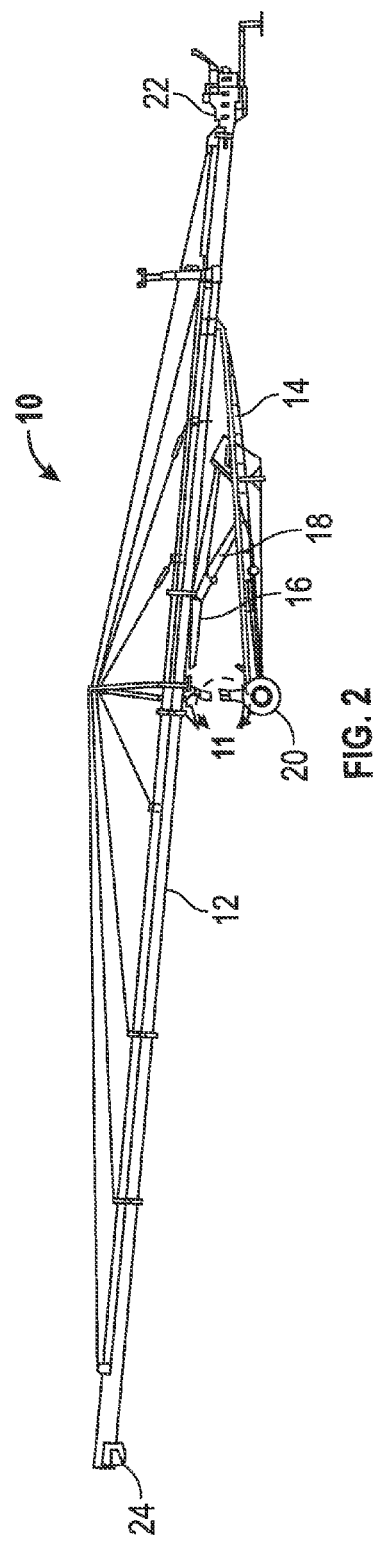

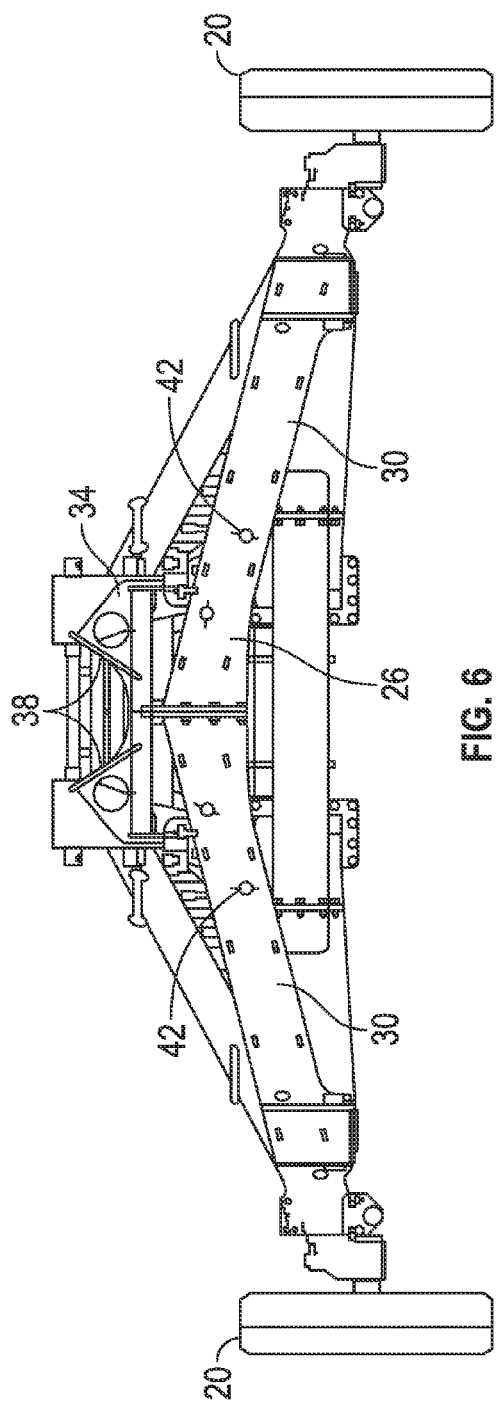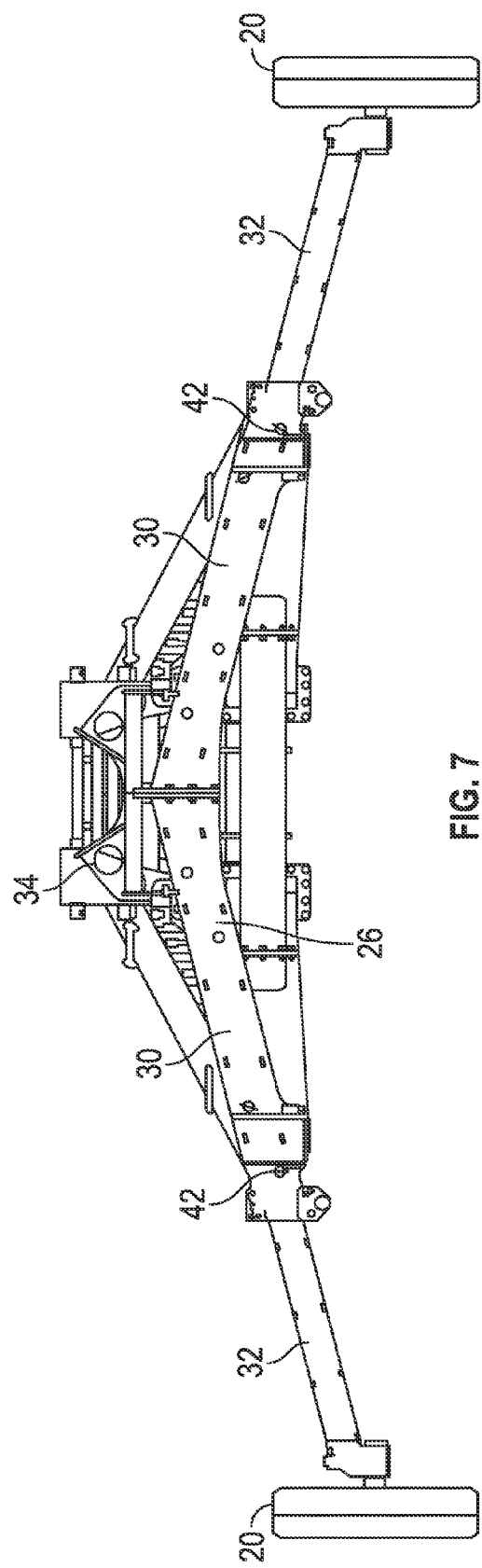

GRAIN AUGER SUPPORT FRAME

FIELD OF THE INVENTION

The invention is directed towards a grain auger, and particularly, an improved support frame for the grain auger with an elongated conveyor tube having auger flighting, wheels for transporting the auger, and a lift assembly for moving the conveying between a lowered transport position and raised use position.

BACKGROUND OF THE INVENTION

Conventional grain augers used for filling grain bins include an elongated tube conveyor with rotatable flighting therein to convey grain from a lower inlet to an upper discharge or outlet. Various types of frames are used for supporting the conveyor, such as an A-frame or a scissor lift frame. The frames include an axle with a pair of wheels so that the auger can be transported. In the transport position, conventional grain augers have a lengthy cantilevered portion of the conveyor extending rearwardly from a support member located closer to the inlet end than the outlet end of the auger. This long cantilever of the main auger tube creates bounce and instability of the tube during transport. Such bounce and instability increases forces and stress on the tube, which can lead to damage. The support location is also located closer to the inlet than the outlet so as to increase the reach of the auger tube in the use position for unloading grain into the grain bin. However, such location also increases the load forces on the conveyor tube during use.

Therefore, a primary objective of the present invention is the provision of an improved grain auger having an improved support frame which overcomes and avoids the problems of the prior art.

Another objective of the present invention is the provision of a wheeled grain auger having an axle with adjustable width so as to be moveable from a narrow transport position to a wide use position.

Yet another objective of the present invention is the provision of a wheeled grain auger having an axle with telescoping arms.

Another objective of the present invention is the provision of a wheeled grain auger having an axle having opposite angled portions so as to be non-linear.

Still another objective of the present invention is a grain auger with a frame which can be raised so as to increase the height of the conveyor outlet for discharge of grain.

Still another objective of the present invention is the provision of a grain auger having a conveyor support member which minimizes the cantilever length for the conveyor tube when in the transport position.

Yet another objective of the present invention is the provision of a grain auger having a conveyor support member on the frame axle.

A further objective of the present invention is the provision of an improved grain auger which is economical to a manufacturer and durable and safe in use.

These and other objectives will become apparent from the following description of the invention.

SUMMARY OF THE INVENTION

The grain auger of the present invention includes a frame with a conveyor mounted thereon. The conveyor includes a tubular housing with auger flighting therein, and a motor to rotate the flighting. The conveyor has an inlet for receiving grain and an outlet for discharging grain. The conveyor can be raised and lowered between a use position and a transport position, respectively.

The frame includes an axle with a pair of wheels to rollably support the auger. The axle includes telescoping arms so that the axle length is adjustable between a narrow transport position and a wide use position. The axle also includes opposite sides which are angular disposed with respect to one another. Thus, when the telescoping arms are extended, the height of the center of the axle is raised, which also increases the height of the conveyor for better and easier clearance of the grain bin roof for grain discharge.

The auger also includes a lift assembly extending between the frame and the conveyor to move the conveyor between the transport and use positions. The frame includes a two part conveyor support assembly. A cradle is provided on the axle and a support block is provided adjacent the junction of the lift assembly with the conveyor. When the conveyor is in the transport position, the block is nested in the cradle to support the conveyor while minimizing the cantilever length for the conveyor during transport.

BRIEF DESCRIPTION OF THE DRAWINGS

FIG. 1 is a side elevation view of the grain auger of the present invention in a lowered, transport position.

FIG. 2 is a side elevation view of the grain auger with the conveyor raised slightly from the transport position.

FIG. 6 is a rear end elevation view showing the axle arms in the retractor transport position.

FIG. 7 is a rear end view showing the axle arms in an extended use position.

DETAILED DESCRIPTION OF THE PREFERRED EMBODIMENTS

Figure 3:
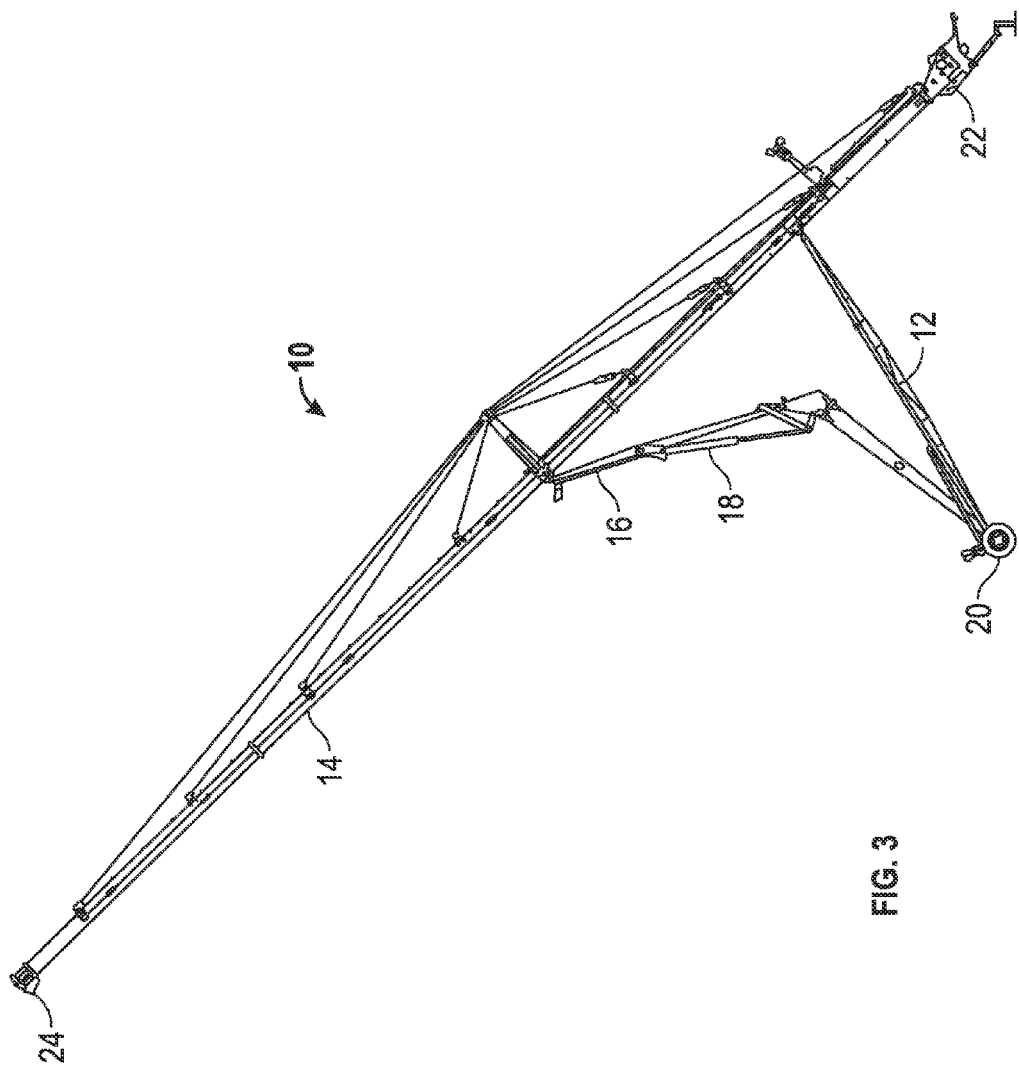
FIG. 3 is a side elevation view of the grain auger with the conveyor in the raised use position.
Figure 4:
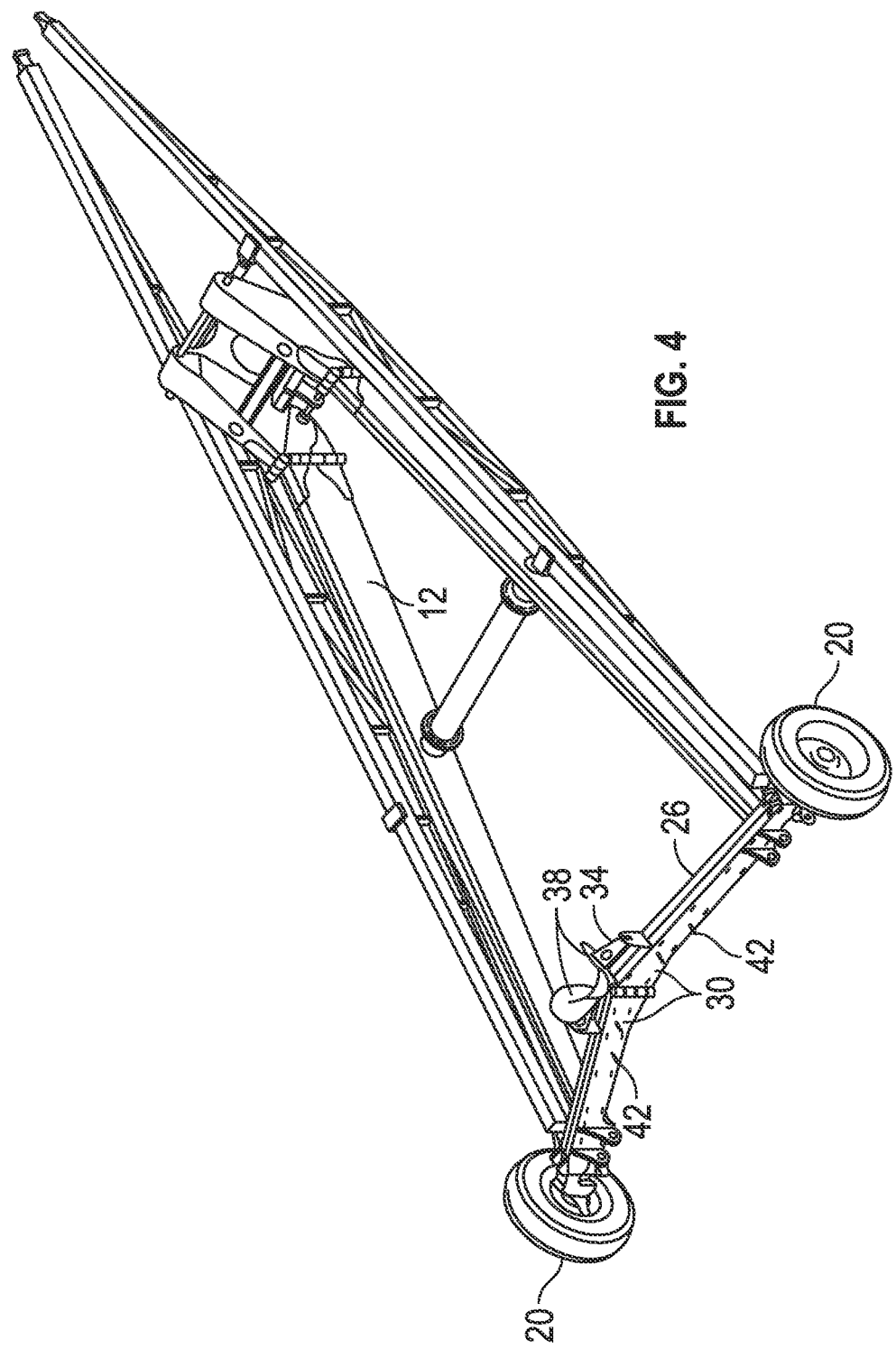
FIG. 4 is a perspective view of the grain auger frame with the adjustable axle arms retracted to the transport position.
Figure 5:
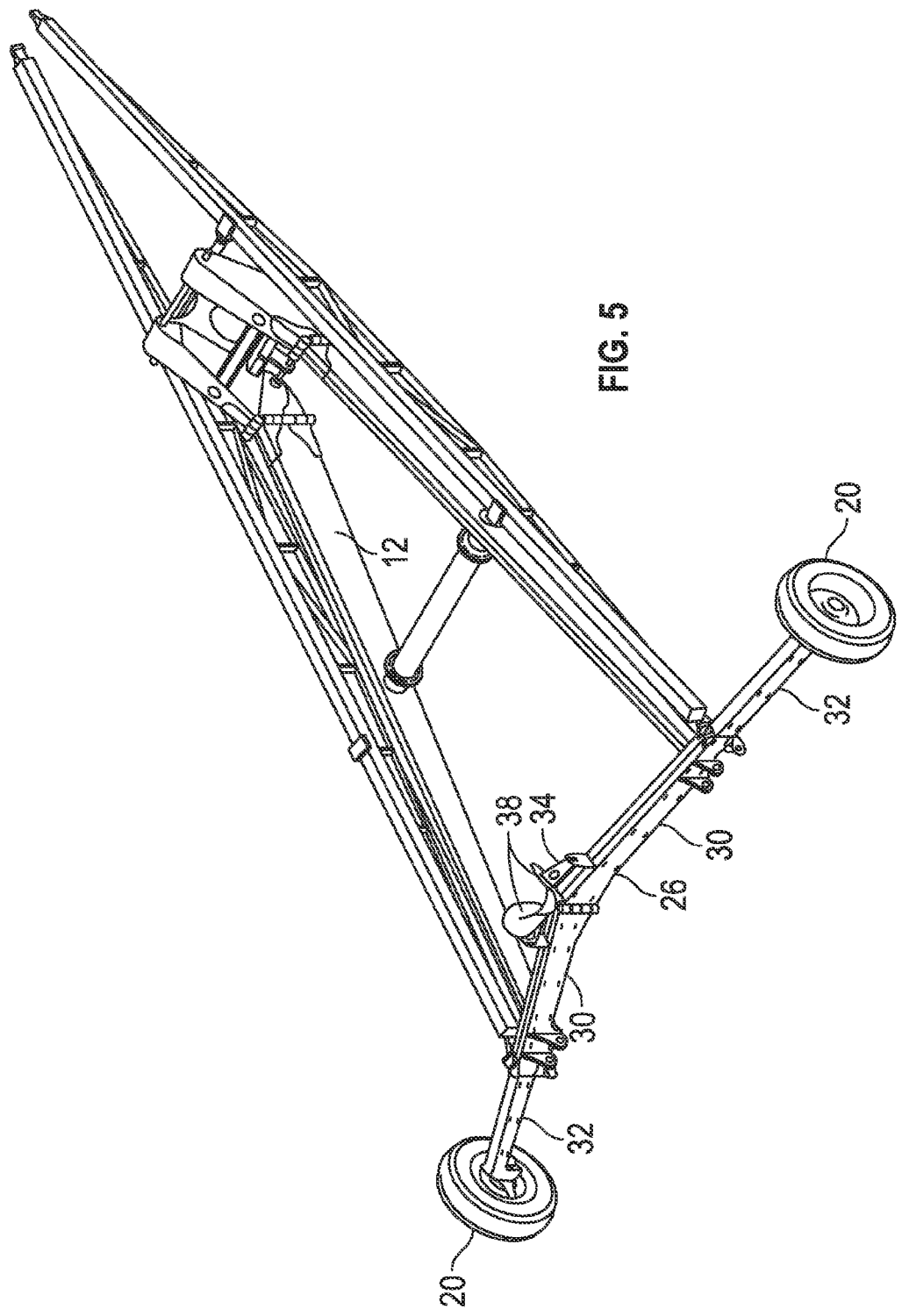
FIG. 5 is a perspective view of the grain auger from with the axle arms extended to the use position.

The grain auger 10 of the present invention includes a frame 12 with an elongated conveyor 14 mounted on the frame 12. A lift assembly 16 extends between the frame 12 and the conveyor 14 and includes a hydraulic cylinder 18 so as to move the conveyor 14 between a lowered transport position, shown in FIG. 1, and a raised use position, shown in FIG. 3. The frame 12 includes a pair of wheels 20 to transport the auger 10. The conveyor 14 has an inlet end 22 for receiving grain and an outlet end 24 for discharging grain.

The improvements to the grain auger 10 are directed towards the axle 26 and the conveyor support assembly 28. More particularly, as best shown in FIGS. 4-7, the axle 26 includes a pair of hollow members 30 joined at their inner ends and extending downwardly and outwardly to their outer ends. The members 30 define left and right sides of the axle 26. The axle 26 further includes a pair of telescoping arms 32 extending from the hollow axle members 30 so as to be moveable between a retracted, narrow transport position (shown in FIGS. 4 and 6) and an extended, wide use position (shown in FIGS. 5 and 7). The wheels 20 are rotatably mounted on the ends of the arms 32. When the arms 32 are extended, the center of the axle at the juncture of the hollow members 30 is raised. The change in the axle length and height between the transport and use position will depend on the overall size of the grain auger 10. For example, in one embodiment, each arm 32 can be extended approximately 3 feet so that the overall length of the axle 26 can be increased approximately 6 feet from the transport position to the use position. With the preferred angle of the hollow members 30 being approximately 15 degrees, the center height of the axle 26 will increase approximately 1 foot from the transport to the use positions. When the grain auger 10 is hitched to a tractor or truck for transport, the angular orientation of the axle members 30 provides additional clearance beneath the center of the auger 10. The angular shape of the axle 26 also increases the structural integrity of the axle when the conveyor 14 is moved to the transport position, wherein the conveyor loads are transferred to the axle.

To extend or retract the telescoping arms 32, a user will lift the axle 26 by any convenient means, such as a crank jack, so as to raise the wheels 20 off the ground. One or more pins 42 which extend through the hollow members 30 and the telescoping arms 32 are pulled out so that the arms 32 can be moved inwardly or outwardly to a desired position. Then, the pins 42 are reinserted through the hollow members 30 and telescoping arms 32 to retain the arms in the selected position. The jack is then lowered and removed.

Figure 8:
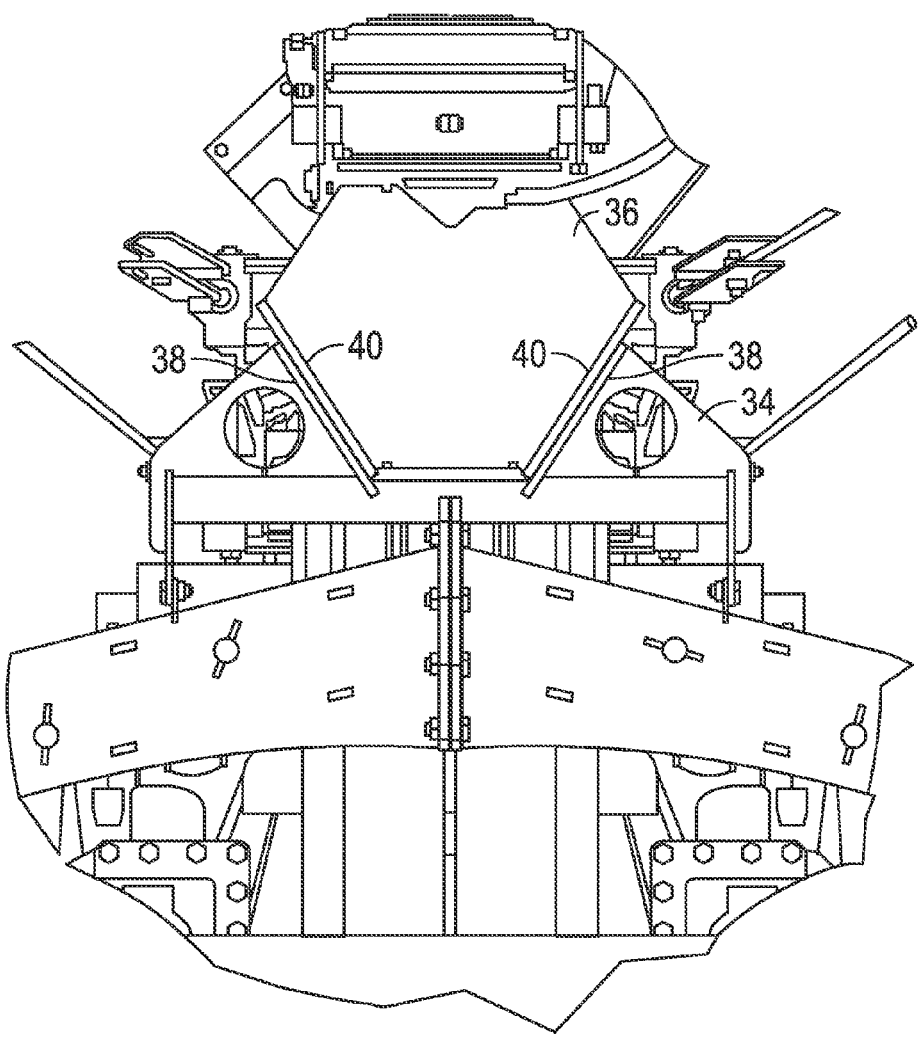
FIG. 8 is an enlarged, partial rear end view showing the conveyor support members nested in the cradle on the axle.
Figure 9:
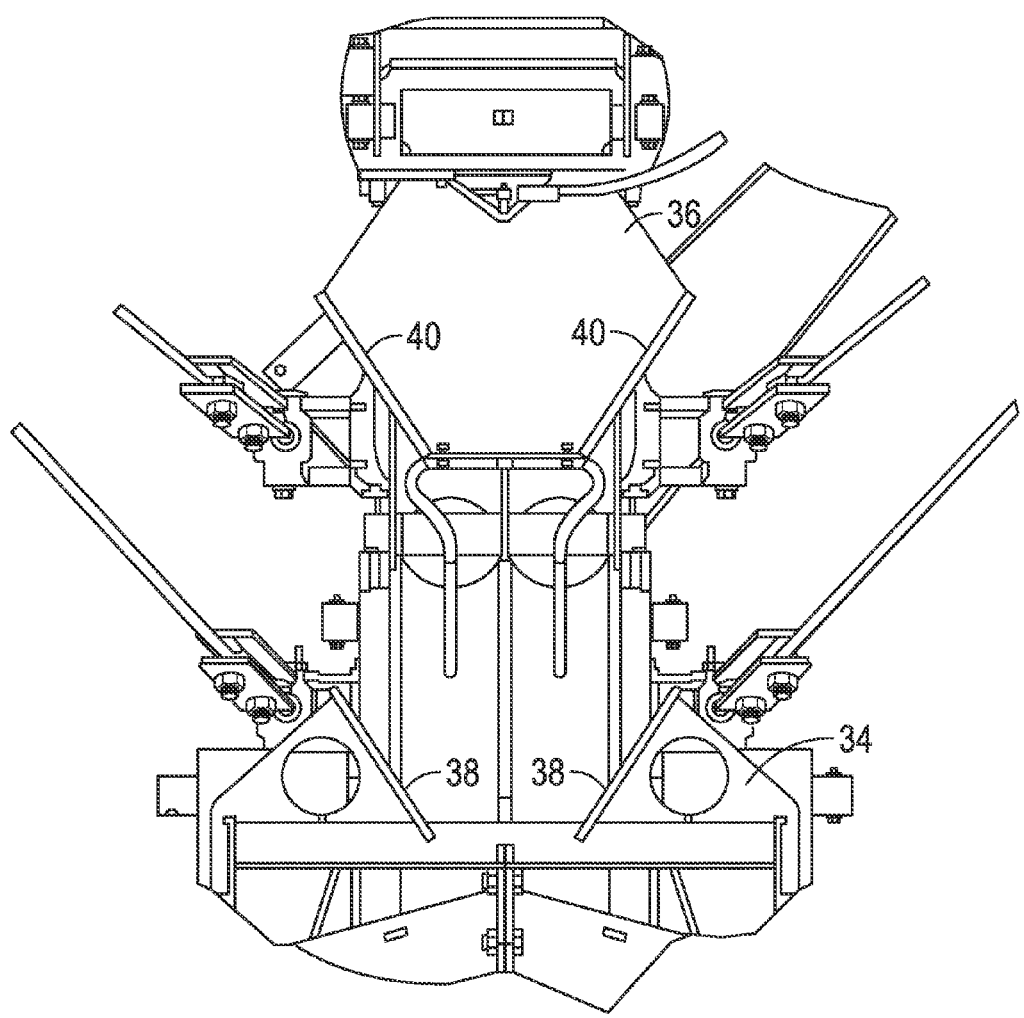
FIG. 9 is an enlarged, partial rear end view showing the conveyor support member disengaged from the cradle.
Figure 10:
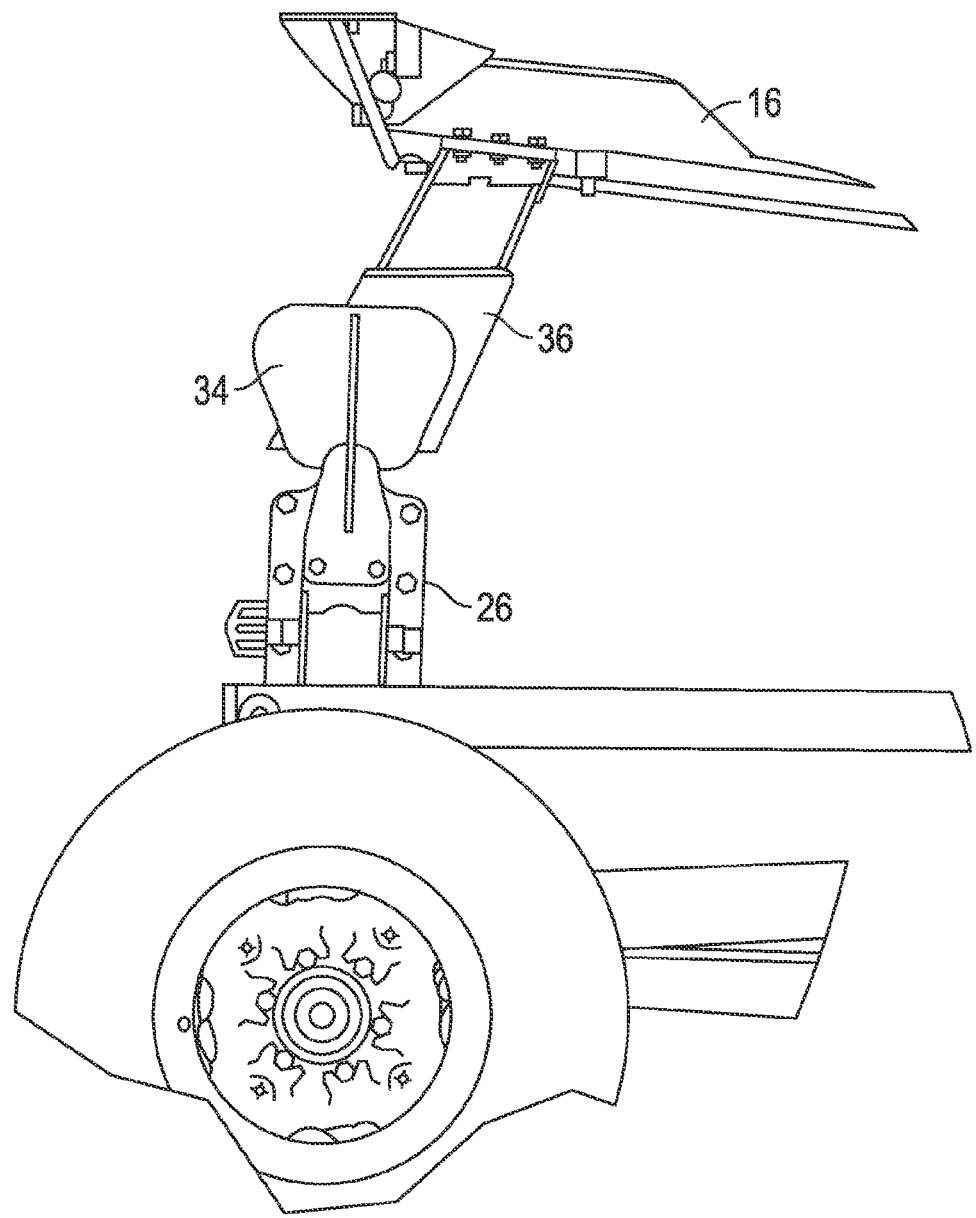
FIG. 10 is a partial side elevation view showing the conveyor support member nested in the cradle on the axle.
Figure 11:
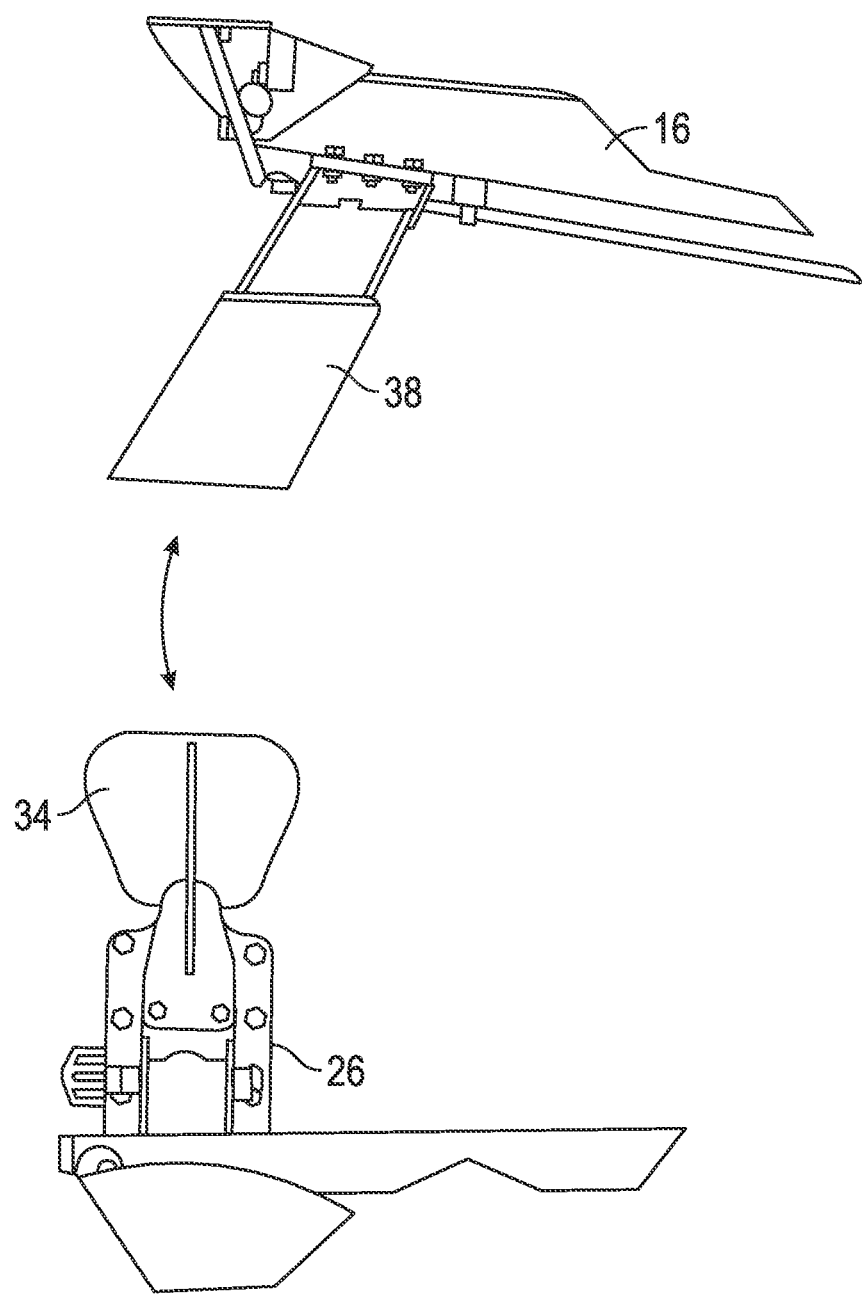
FIG. 11 is a partial side elevation view showing the conveyor support member disengaged from the cradle.

The support assembly 28 of the grain auger 10 has two primary components, the cradle 34 and the support block 36. The cradle is mounted on the axle 26, while the block 36 is mounted at the upper end of the lift assembly 16 adjacent the tube or housing of the conveyor 14. Preferably, the support block 36 is located directly under the auger tube of the conveyor 14. The cradle 34 and the block 36 have complementary shapes such that the block 36 will nest within the cradle 34 when the conveyor 14 is lowered to the transport position. For example, as seen in FIGS. 8 and 9, the cradle 34 has a pair of plates 38 inclined upwardly and outwardly, while the block 36 has opposite sides 40 inclined downwardly and inwardly for mating receipt in the cradle. The scissor-type lift assembly 16, as shown in the drawings, eliminates any structure between the wheels 20 and a grain bin when the auger 10 is moved into a use position with the conveyor outlet 24 positioned above the grain bin roof. The location of the cradle 34 and the support block 36 maximizes the reach of the conveyor 14 in the raised use position.

By locating the cradle 34 on the axle 26 and the support block 36 at the upper end of the lift assembly 16, the cantilever length of the conveyor 14 is minimized when the conveyor is in the transport position. By minimizing the cantilever length, the bounce and instability of the conveyor is decreased during transport, thereby minimizing forces and other stress on the conveyor.

Figure 12:
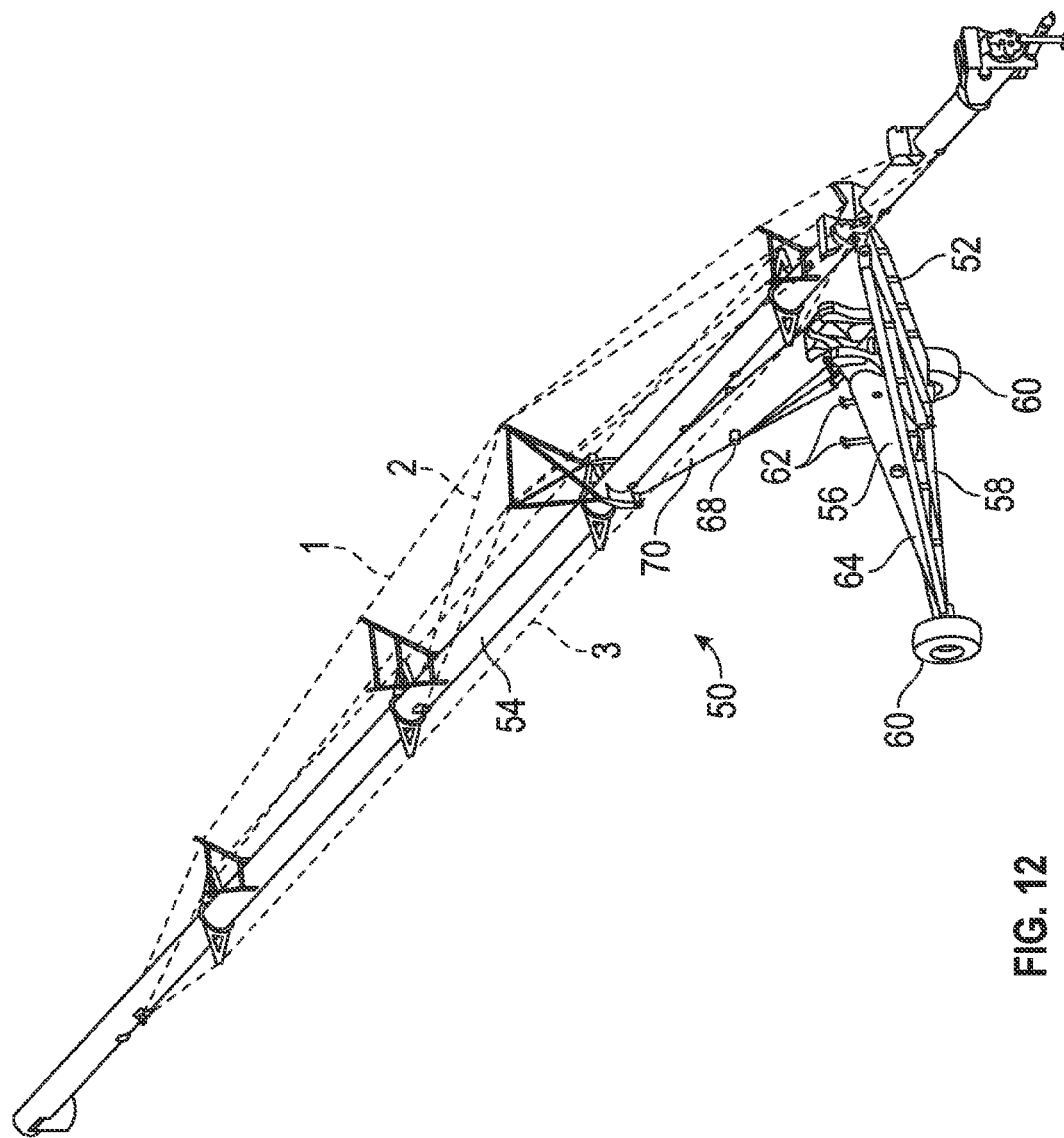
FIG. 12 is a perspective view of a prior art grain auger having a conveyor support and cradle spaced forwardly from the axle.
Figure 13:
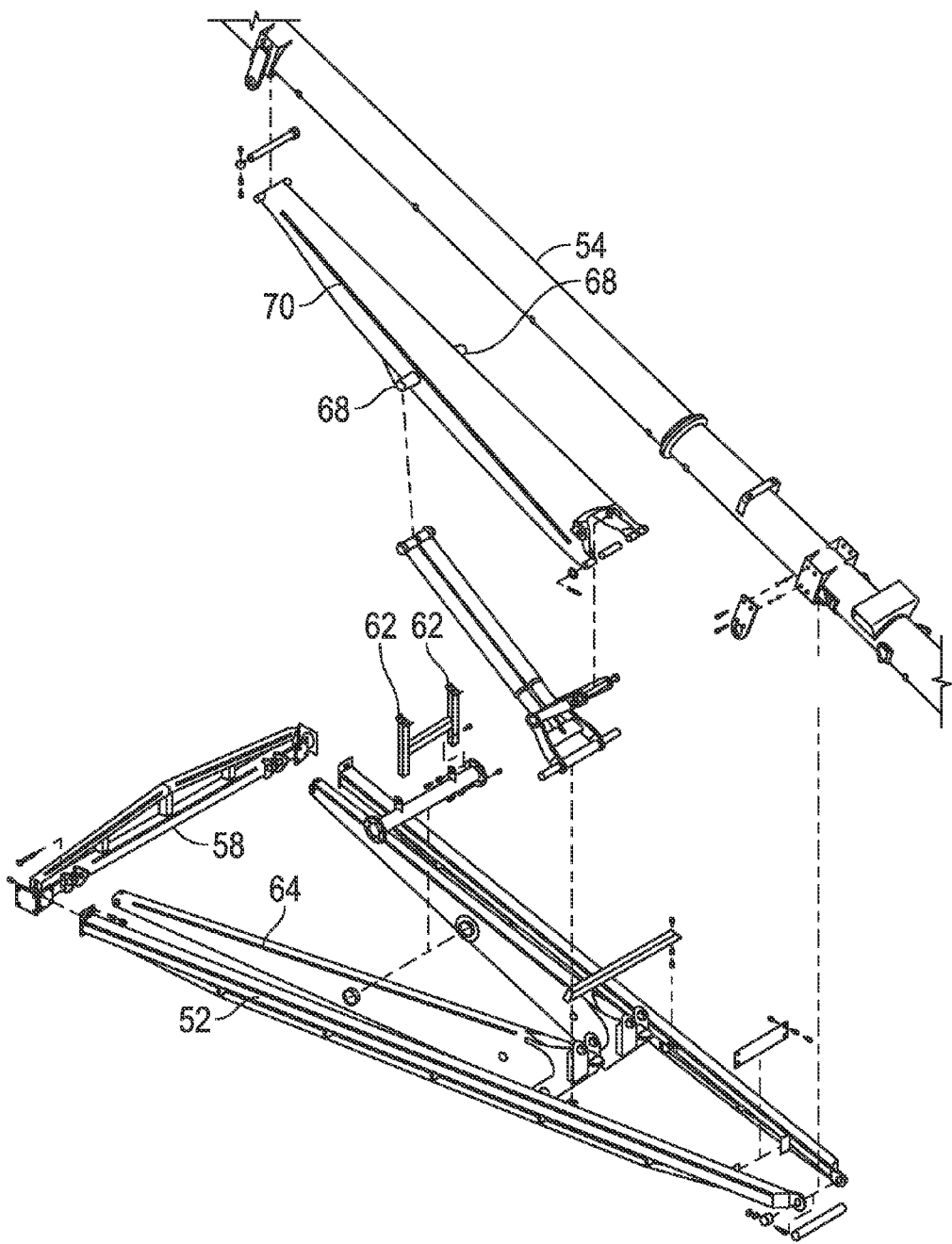
FIG. 13 is an exploded perspective view of the prior art grain auger shown in FIG. 12.

In comparison, FIGS. 12 and 13 show a prior art grain auger 50 having a frame 52, a conveyor 54, and a lift assembly 56. An axle 58 with wheels 60 rollably supports the auger 50. The cradle 62 of the auger 50 is located on a lower arm 64 of the lift assembly 56, substantially forwardly from the axle 58.

The support rods 68 extend outwardly from opposite sides of an upper arm 70 of the lift assembly 56 for receipt in the cradle 62. The support rods 68 are spaced substantially forwardly from the upper end of the arm 70, as best seen in FIG. 13. Thus, because the cradle 62 and the support rods 68 are spaced forwardly from the axle 58 and the upper end of the lift assembly 56, the cantilever length for the conveyor 54 in the transport position is substantially longer than for the conveyor 14 of the improved grain auger 10. The greater cantilever length creates greater bounce, instability, and forces on the conveyor 54 during transport.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved grain auger having a frame with a pair of wheels and a conveyor mounted on the frame, the improvement comprising:
   an axle extending between the wheels;
   the axle having opposite inclined arms extendible and retractable in inclined directions to provide the axle with an adjustable length and height whereby the wheels can be selectively spaced closer together for transport of the auger and further apart for use of the auger; and
   the arms extending angularly with respect to one another.

2. The grain auger of claim 1 wherein the axle has a midpoint with a height that increases as the wheel spacing increases.

3. The grain auger of claim 1 wherein the axle height increases as the spacing of the wheels increases.

4. The grain auger of claim 1 wherein the axle has a center cradle to support the conveyor during transport.

5. The grain auger of claim 1 wherein the arms are angled approximately 15° relative to one another.

6. The grain auger of claim 1 wherein the axle is adjustable between a narrow transport position and a wide use position.

7. The grain auger of claim 1 wherein the axle is adjustable between a lowered transport position and a raised use position.

8. An improved grain auger having a frame with a pair of wheels and a conveyor mounted on the frame, the improvement comprising:
   an axle extending between the wheels; and
   the axle including a pair of telescoping arms extending at vertically inclined angles with respect to one another, whereby the length and height of the axle is adjustable.

9. The grain auger of claim 8 wherein the axle has a midpoint with a height that increases as the wheel spacing increases.

10. The grain auger of claim 8 wherein the axle height increases as the spacing of the wheels increases.

11. The grain auger of claim 8 wherein the axle has a center point and the arms extend outwardly in opposite directions from the center point.

12. The grain auger of claim 8 wherein the arms are angled approximately 15° relative to one another.

13. The grain auger of claim 8 wherein the axle is adjustable between a narrow transport position and a wide use position.

14. The grain auger of claim 8 wherein the axle is adjustable between a lowered transport position and a raised use position.

* * * * *